(12) United States Patent
Kipnis (10) Patent No.: US 11,519,324 B1
(45) Date of Patent: Dec. 6, 2022

(54) FOUR-STROKE ENGINE WITH TWO-STAGE EXHAUST CYCLE

(71) Applicant: Cyclazoom, LLC, Skokie, IL (US)

(72) Inventor: Michael Kipnis, Skokie, IL (US)

(73) Assignee: Cyclazoom, LLC, Skokie, IL (US)

( * ) Notice: Subject to any disclaimer, the term of this patent is extended or adjusted under 35 U.S.C. 154(b) by 0 days.

(21) Appl. No.: 17/663,953

(22) Filed: May 18, 2022

(51) Int. Cl.
    *F02B 29/02* (2006.01)
(52) U.S. Cl.
    CPC .................................. *F02B 29/02* (2013.01)
(58) Field of Classification Search
    CPC ........... F02B 47/00; F02B 47/08; F02B 29/02
    See application file for complete search history.

(56) References Cited

U.S. PATENT DOCUMENTS

| | | | |
|---|---|---|---|
| 2,431,563 A | 11/1947 | Johansson | |
| 3,875,914 A * | 4/1975 | Villella | F02B 47/08 |
| | | | 123/568.2 |
| 3,905,344 A * | 9/1975 | Villella | F02B 47/08 |
| | | | 123/568.11 |
| 3,918,420 A * | 11/1975 | Villella | F02B 47/08 |
| | | | 123/568.23 |
| 5,456,219 A | 10/1995 | Clarke | |
| 6,393,841 B1 | 5/2002 | Van Husen | |
| 7,845,317 B2 | 12/2010 | Max et al. | |
| 7,975,485 B2 | 7/2011 | Zhao et al. | |
| 8,677,749 B2 | 3/2014 | Laimboeck et al. | |
| 8,910,613 B2 | 12/2014 | Amplatz | |
| 9,121,330 B2 | 9/2015 | Straub | |

* cited by examiner

*Primary Examiner* — Gonzalo Laguarda
(74) *Attorney, Agent, or Firm* — Brian Roffe (57) ABSTRACT

Engine includes a cylinder having a peripheral wall defining a combustion chamber, a crankshaft, and a piston movable in the cylinder. Intake and exhaust valves regulate flow of an air into or combustion products out of the combustion chamber, respectively. An exhaust outlet port has an opening in the peripheral wall at a location between lowermost and uppermost piston positions, and an outlet port valve is associated with the exhaust outlet port. The exhaust stroke has a first exhaust stage in which combustion products exhaust through the exhaust outlet port when an upper surface of the piston is below the opening, and the outlet port valve opens. In a second, subsequent exhaust stage, during continued movement of the piston past the opening in the peripheral wall, the outlet port valve closes and remaining combustion products in the combustion chamber exhaust around the exhaust valve.

15 Claims, 12 Drawing Sheets

FOUR-STROKE ENGINE WITH TWO-STAGE EXHAUST CYCLE

FIELD OF THE INVENTION

The present invention relates to a four-stroke engine with a modified exhaust cycle, namely, a two-stage exhaust cycle. The present invention also relates to a method for modifying an engine to include a two-stage exhaust cycle. The present invention also relates to a cylinder for an engine that enables a two-stage exhaust cycle.

BACKGROUND OF THE INVENTION

A four stroke engine, also known as a four stroke cycle, has four strokes, namely, an intake stroke, a compression stroke, a combustion stroke and an exhaust stroke. In the intake stroke, the piston lowers in a surrounding cylinder, drawing air into the cylinder through an intake valve while a fuel injector simultaneously sprays fuel into the cylinder (or a mixture of fuel and air). In the subsequent compression stroke, all of the valves are closed and the crankshaft to which the piston is attached rotates to cause the piston to move up in the cylinder thereby compressing the air-fuel mixture. In the subsequent combustion stroke, or power stroke, when the piston reaches the top of the cylinder, a spark plug or other ignition means ignites the fuel-air mixture. The resulting combustion forces the piston to the bottom of the cylinder again. In the following exhaust stroke, when the piston reaches the bottom of the cylinder, the exhaust valve opens and as the piston moves up again, it forces the exhaust out of the cylinder. At the same time, it creates significant back pressure force on the piston reducing positive forces rotating the crankshaft. This cycle repeats itself to causes rotation of the crankshaft and generate power for powering, for example, a vehicle.

U.S. Pat. No. 6,393,841 (Van Husen) describes an Internal combustion engine having separately designated combustion and exhaust powered cylinders, for implementing a dual exhaust expansion system which derives additional power from the combustion exhaust gases of each cylinder. The piston in each combustion exhaust cylinder is timed such that one leads the other by approximately 0-180 degrees crankshaft angle. Ignition of a first combustible air/fuel mixture produces combustion gases. Expansion of the combustion gases drives the first combustion piston during a first power stroke. Combustion gases are expelled from the cylinder to a second cylinder via fluidic passage to produce a second power stroke in the second cylinder, from there the combustion gasses are exhausted to atmosphere. Ignition of a second combustible air/fuel mixture produces combustion gases. Expansion of the combustion gases drives the second combustion piston during a third power stroke. Combustion gases are expelled from the second cylinder to the first cylinder via fluidic passage to produce a fourth power stroke in the first cylinder from there, the combustion gases are exhausted to atmosphere in a predetermined cycle. The engine also includes a blower that forces air through an intake port into the combustion exhaust cylinder during an initial portion of a first intake compression stroke of the combustion exhaust piston so that the air is subsequently compressed within the combustion exhaust cylinder during the remainder of the first intake compression stroke.

U.S. Pat. No. 7,975,485 (Zhao et al.) describes a reciprocal combustion engine integrated with both compound cycle and combined cycle. The engine includes a twin compound cylinder structure, with the first cylinder being the primary combustion and/or expansion cylinder; the second cylinder being the secondary combustion and/or expansion cylinder. Power strokes driven by expansions of different working fluids such as air-fuel mixture, steam and compressed air, are integrated into one engine block. Twin cylinder structure provides compound expansions of three different fluids as to recover the energies that would be lost with the exhaust fluids or during braking. There is an outlet from the combustion chamber of the second cylinder to a piston valve that controls working fluid discharge from the second cylinder to an associated exhaust port, which is actuated vertically by exhaust gas pressure from the second cylinder.

U.S. Pat. No. 8,677,749 (Laimboeck et al.) describes an engine with a first set of exhaust ports in the cylinder walls that are coupled to a first exhaust turbine, which may be a pulse turbine. A second set of exhaust ports are provided in the cylinder walls that are opened by the piston near the end of the expansion stroke. The second set of exhaust ports is coupled to a second exhaust turbine, a low pressure turbine. The first and second sets of exhaust ports are decoupled, except when the piston uncovers the second plurality of exhaust ports such that they are coupled via the combustion chamber. By decoupling the ports, the high pressure turbine is provided gases at high pressure, while available. During the remainder of the exhaust process, the gases are flow to the lower pressure turbine. Additionally, the outlet of the high pressure turbine is coupled to the inlet of the low pressure turbine.

Additional prior art of interest includes U.S. Pat. No. 2,431,563 (Johansson), U.S. Pat. No. 5,456,219 (Clarke), U.S. Pat. No. 7,845,317 (Max et al.), U.S. Pat. No. 8,910,613 (Amplatz), and U.S. Pat. No. 9,121,330 (Straub).

OBJECTS AND SUMMARY OF THE INVENTION

It is an object of at least one embodiment of the present invention to provide new and improved four-stroke stroke engines.

It is an object of at least one embodiment of the present invention to provide an exhaust cycle for a four-stroke engine that is more efficient than prior art exhaust cycles for four-stroke engines.

It is still an object of at least one embodiment of the present invention to provide a two-stage exhaust cycle for a four-stroke engine, making it a sort of five-stroke engine, which is more efficient than prior art exhaust cycles for four-stroke engines, significantly reducing back pressure on the piston and exhaust gases and therefore increasing efficiency of the engine.

It is an object of at least one embodiment of the present invention to provide a method for retrofitting or modifying an existing engine to have a two-stage or dual-stage exhaust stroke.

In order to achieve one or more of these objects, and possibly others, an engine in accordance with the invention includes a cylinder having a peripheral wall defining a combustion chamber, a crankshaft, and a piston movable in the cylinder toward a first, typically top side of the cylinder in a compression stroke and an exhaust stroke and toward a second, opposite usually bottom side of the cylinder in an intake stroke in which air is inlet into the combustion chamber and a power stroke in which a mixture of air and fuel in the combustion chamber is ignited and the crankshaft to which the piston is coupled is rotated as a result of combustion of the mixture of air and fuel. An intake valve is associated with the cylinder and regulates flow of air into the combustion chamber during the intake stroke, while an exhaust valve is associated with the cylinder and regulates flow of products of combustion out of the combustion chamber. By being associated with the cylinder, the intake and exhaust valves are operative to move between states or positions in which they do not allow flow into or out of the combustion chamber and states or positions in which they do allow flow into or out of the combustion chamber. The valves may be positioned in conduits that lead to the combustion chamber or have a part against an edge of the cylinder and being moved apart from this edge to open or close a channel into the combustion chamber.

In accordance with the invention, the engine also includes an exhaust outlet port having an opening in the peripheral wall of the cylinder at a location between lowermost and uppermost positions of the piston, and an outlet port valve associated with the exhaust outlet port. By being associated with the exhaust outlet port, the outlet port valve is operative to move between a state or position in which it allows flow out of the combustion chamber but does not allow flow back from the exhaust outlet port, and a state in which all flow between the combustion chamber and the exhaust outlet port is blocked.

With this construction, the exhaust stroke is a two-stage exhaust stroke wherein in a first exhaust stage, combustion products exhaust through the exhaust outlet port when an upper surface of the piston is below the opening, the piston is moving toward the top side of the cylinder and the outlet port valve is in an open state because of exhaust gas pressure. In a second exhaust stage after the first exhaust stage during continued movement of the piston toward the top side of the cylinder past the opening in the peripheral wall of the cylinder, the outlet port valve is in a closed state and remaining combustion products in the combustion chamber exhaust around or through the exhaust valve. The piston is movable toward the bottom side of the cylinder in the intake stroke after the exhaust stroke is completed which enables more air to be inlet into the combustion chamber (fuel being inlet into the combustion chamber during the compression stroke by a fuel injector at an appropriate time as in prior art engines) because of a more cleaner exhaust with minimized remaining combustion pressure and combustion products.

In some embodiments, a spark plug is provided to ignite the mixture of air and fuel in the combustion chamber to cause the power stroke. The outlet port valve may be a reed valve in the exhaust outlet port. Generally, the outlet port valve is configured to open based on a pressure differential whereby a greater pressure in the combustion chamber than in the exhaust outlet port causes movement of the valve to the open state.

Preferably, a region between the opening and the peripheral wall of the cylinder is smooth without any sharp edges to reduce and ideally avoid turbulence.

A method for modifying an engine is also disclosed and is effective on an engine that includes a cylinder having a peripheral wall defining a combustion chamber, a crankshaft, a piston movable in the cylinder toward a first, typically top side of the cylinder in a compression stroke and an exhaust stroke and toward a second, opposite usually bottom side of the cylinder in an intake stroke in which air is inlet into the combustion chamber and a power stroke in which a mixture of air and fuel in the combustion chamber is ignited and the crankshaft to which the piston is coupled is rotated as a result of combustion of the mixture of air and fuel, an intake valve associated with the cylinder regulating flow of air into the combustion chamber during the intake stroke, and an exhaust valve associated with the cylinder regulating flow of products of combustion out of the combustion chamber. In the method, an exhaust outlet port is provided having an opening in the peripheral wall of the cylinder at a location between lowermost and uppermost positions of the piston. The exhaust stroke is formed as a two-stage exhaust stroke by coupling an outlet port valve to the exhaust outlet port and which is configured to open based on a pressure differential to cause combustion products to exhaust through the outlet port valve into the exhaust outlet port in a first exhaust stage when an upper surface of the piston is below the opening in the peripheral wall of the cylinder and the piston is moving toward the top side of the cylinder.

Further, remaining combustion products are exhausted from the combustion chamber around or through the exhaust valve, in a second exhaust stage after the first exhaust stage, during continued movement of the piston toward the top side of the cylinder when the piston is above the opening in the peripheral wall of the cylinder, the outlet port valve being in a closed state during the second exhaust stage, but the exhaust valve is open to complete removal of remaining combustion products and reduce or minimize remaining back pressure on the piston in the combustion chamber. The same variations to the engine described above may be applied to the method as well.

A cylinder for an engine in accordance with the invention includes a peripheral wall defining a combustion chamber, a piston that moves in the combustion chamber toward a first, typically top side of the cylinder in a compression stroke and an exhaust stroke and toward a second, opposite usually bottom side of the cylinder in an intake stroke in which air is inlet into the combustion chamber and a power stroke in which a mixture of air and fuel in the combustion chamber is ignited, an intake valve regulating flow of air into the combustion chamber during the intake stroke, and an exhaust valve regulating flow of products of combustion in the combustion chamber out of the combustion chamber. The cylinder also includes an exhaust outlet port having an opening in the peripheral wall at a location between lowermost and uppermost positions of the piston, and an outlet port valve associated with the exhaust outlet port.

As such, the exhaust stroke is a two-stage exhaust stroke wherein in a first exhaust stage, combustion products exhaust through the exhaust outlet port when an upper surface of the piston is below the opening in the peripheral wall, the piston is moving toward the top side of the cylinder and the outlet port valve is in an open state, and in a second exhaust stage after the first exhaust stage during continued movement of the piston toward the top side of the cylinder past the opening in the peripheral wall of the cylinder, the outlet port valve is in a closed state and remaining combustion products in the combustion chamber exhaust around or through the exhaust valve. The same variations to the engine described above may be applied to the cylinder as well.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
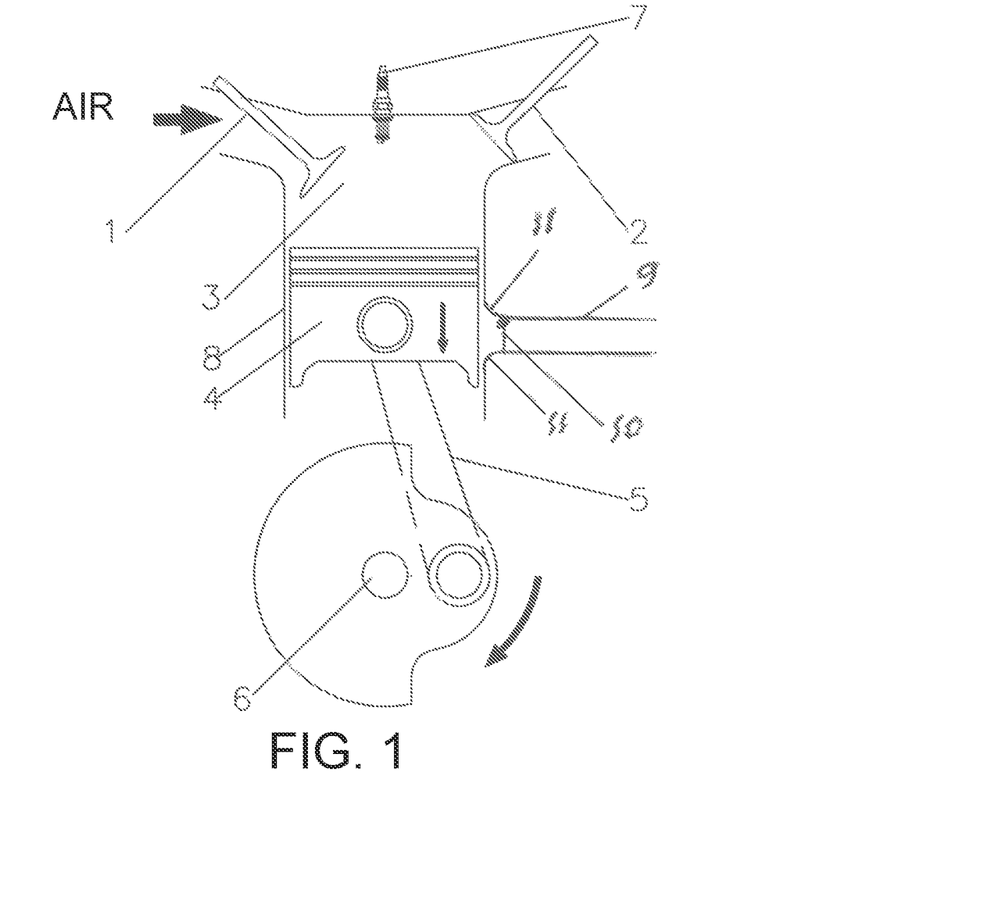
FIG. 1 is a schematic of the intake stroke of an engine in accordance with the invention.

Referring to the accompanying drawings wherein the same reference numbers refer to the same or similar components, FIG. 1 is a schematic of the intake stroke of an engine in accordance with the invention, which is similar to prior art intake strokes for four stroke engines. Any variant to the intake stroke in prior art engines may be applied to the invention as well because the difference between the inventive engine and the prior art lies primarily in the exhaust cycle. Although a single cylinder is shown, it is understood that the engine may include multiple cylinders in any conventional arrangement, e.g., in a row or V-shape.

As shown in FIG. 1, which depicts the intake stroke, the engine includes a cylinder 8, and a piston 4 movable up and down in an interior space defined by a peripheral wall of the cylinder 8 and which has a connection rod 5 connecting the piston 4 to a crankshaft 6. The crankshaft 6 rotates clockwise as indicated by the arrow and the piston moves downward as indicated by the arrows during the intake stroke. Also shown are an intake valve 1 at a top of the cylinder 8 which is in an open position so that air and fuel as a mixture can be drawn through a conduit into a combustion chamber 3 portion of the interior space defined by the peripheral wall of the cylinder 8 between an upper surface of the piston 4 and the upper surface of the cylinder 8 defining the interior space.

An advantage of the invention, based on the construction of the cylinder 8 described below, is that since the combustion products from the previous combustion stroke have been removed to a greater extent than in prior art engines, there is the ability to input more air and fuel into the cylinder in the intake stroke. The volume of the combustion chamber 3 is finite so by removing more combustion products, there is an attendant ability to fill this volume with more air and fuel for the next combustion, and thereby improve the energy production. It also results in a reduction in the remaining pressure in the combustion chamber thereby reducing back pressure on the piston.

A spark plug 7 is provided for the cylinder 8, and represents any mechanism to generate a spark to cause ignition of gas in the combustion chamber 3.

The intake valve 1 and the exhaust valve 2, which is shown in a closed position, may be any conventional valves for engines but preferably are of the type disclosed in U.S. Pat. No. 10,787,939, the entire disclosure of which is incorporated by reference herein.

The engine also includes an exhaust outlet port 9 extending from an opening on the side of the cylinder 8. This opening is positioned to be above the upper surface of the piston 4 when the piston 4 is in the down position. An outlet port valve 10, such as a reed valve or other suitable or comparable valve, is positioned in the exhaust outlet port 9. The opening has a curved beveled edge beginning from an edge of the side, interior surface or peripheral wall of the cylinder 8 and extending to the inlet or interior surface of the exhaust outlet port 9, as shown in for example, FIG. 1. This entire transition region 11 between and including the inlet of the exhaust outlet port 9 and an edge of the side, interior surface of the cylinder is preferably made to be smooth without any sharp edges to thereby reduce turbulence (which concept of constructing or configuring engine parts without sharp edges is disclosed in U.S. Pat. No. 10,787,939, the entire disclosure of which is incorporated by reference herein). As disclosed in the '939 patent, a sharp edge is an edge element formed between two straight or flat portions that has an obtuse angle. A reed valve is a type of check valve which restricts the flow of gases to a single direction, opening and closing under changing pressure on each face. Modern versions often consist of flexible metal or composite materials. Thus, the reed valve 10 enables flow from the combustion chamber 3 into the exhaust outlet port 9, and prevents flow from the exhaust outlet port 9 into the combustion chamber 3.

Figure 2:
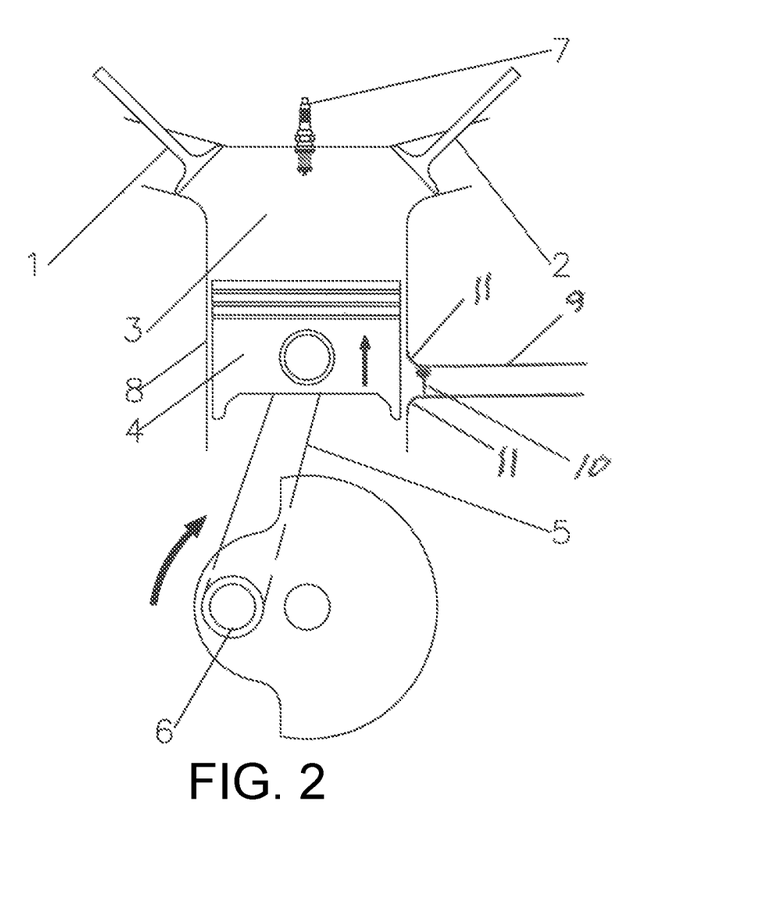
FIG. 2 is a schematic of the compression stroke of the engine of FIG. 1.

FIG. 2 depicts the compression stroke wherein the piston 4 is moving upward as indicated by the arrow on the piston 4, and the intake valve 1 is moved to a closed position, while the exhaust valve 2 remains in the closed position.

Figure 3:
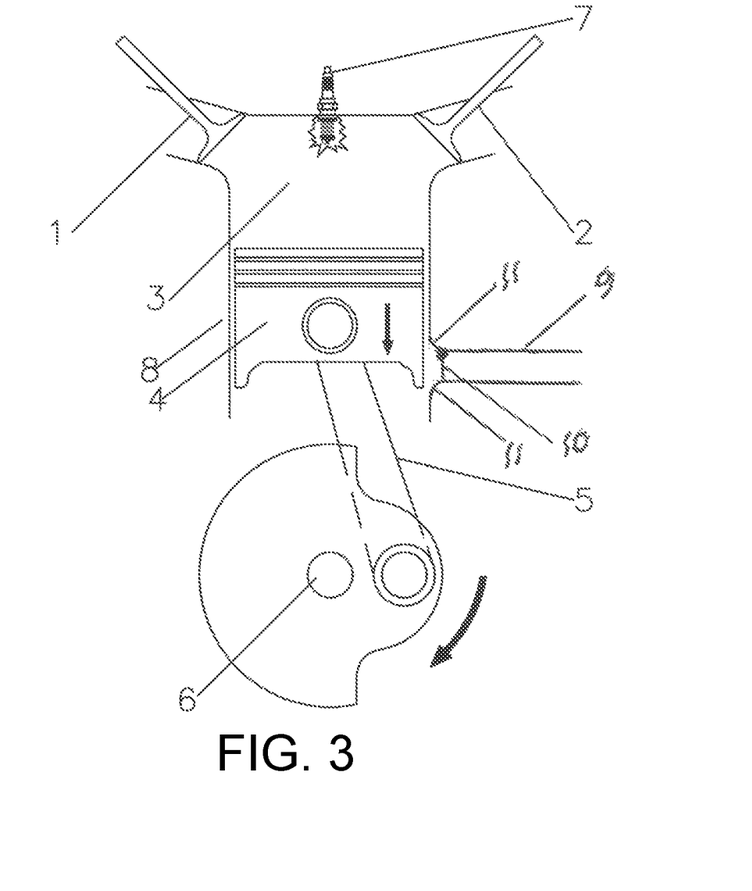
FIG. 3 is a schematic of the power stroke of the engine of FIG. 1.

FIG. 3 depicts the power stroke wherein the spark plug 7 has caused the air and fuel mixture in the combustion chamber 3 to ignite. While both the intake valve 1 and exhaust valve 2 are in a closed position, the piston 4 moves downward as indicated by the arrow. In the compression stroke, there is a cleaner air/fuel mixture because the remains of the previous combustion have been almost completely exhausted, as described below. This enables increased fuel efficiency because there are fewer remaining combustion products. Improved combustion results in fewer or ideally no misfires. More power is obtained from the fuel, and from the displacement volume. There is also better, faster, and a more full and high efficiency fuel burning.

Figure 4:
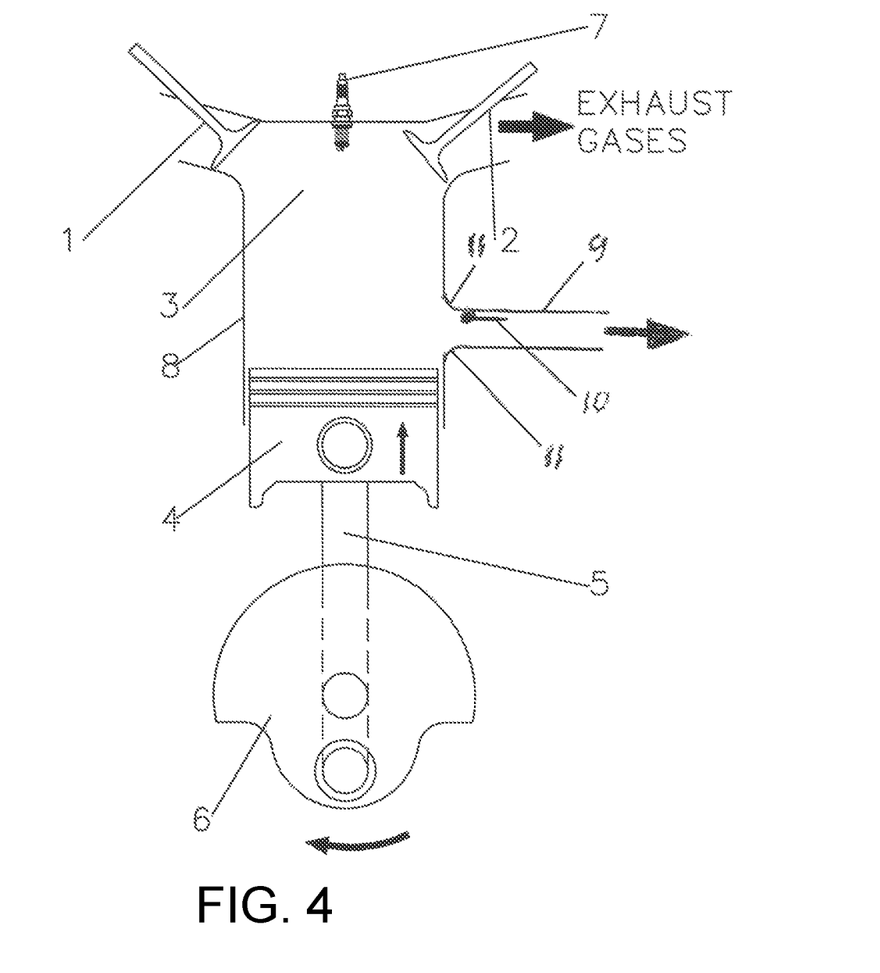
FIG. 4 is a schematic of the first stage of the exhaust stroke of the engine of FIG. 1.
Figure 5:
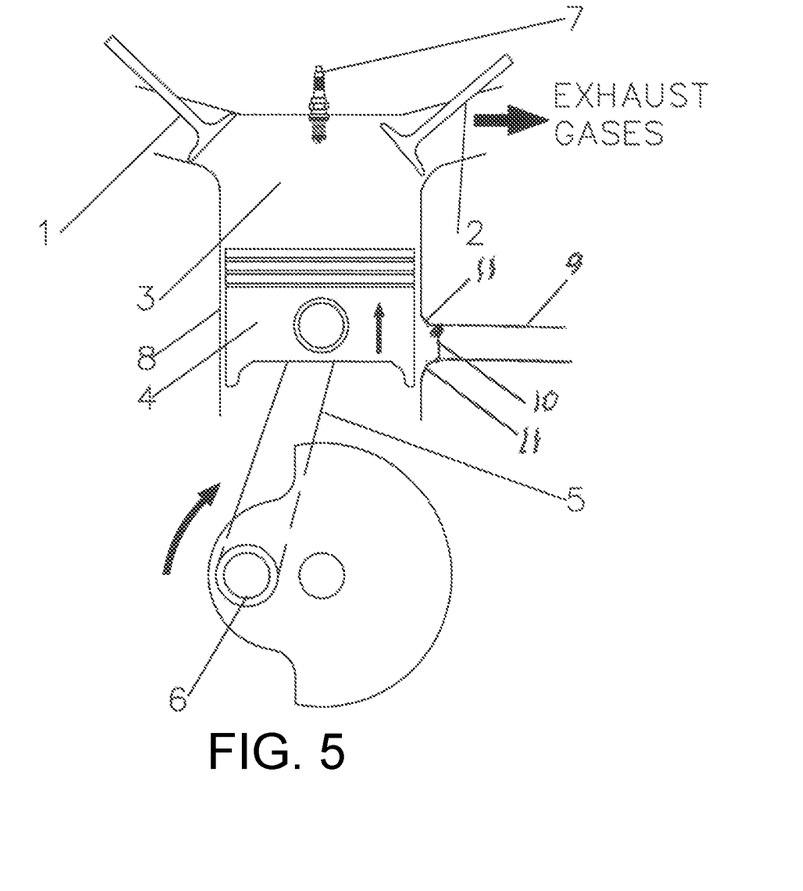
FIG. 5 is a schematic of the second stage of the exhaust stroke of the engine of FIG. 1.
Figure 6:
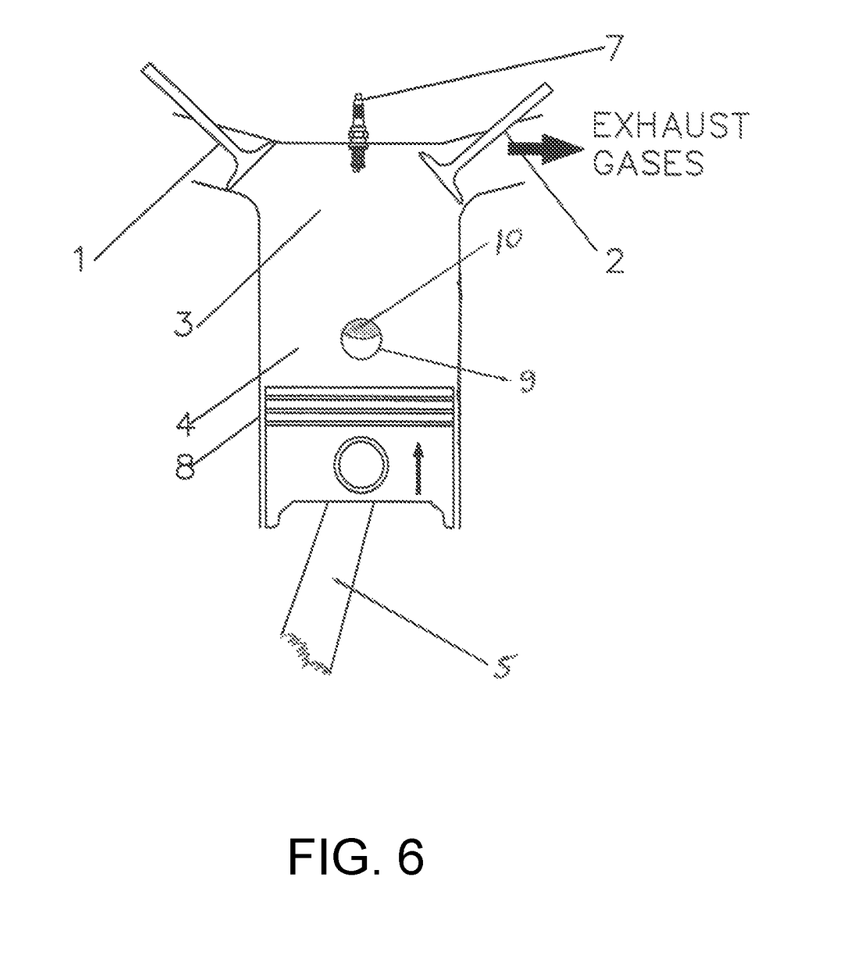
FIG. 6 is a view showing the juncture of the exhaust outlet port with a valve when in the open position like in FIG. 4.

FIGS. 4 and 5 show the manner in which engine operates using the additional exhaust outlet port 9 and reed valve 10. Specifically, in a first stage of the exhaust stroke, the piston 4 is moving upward after having moved downward in the power stroke shown in FIG. 3 to a lowermost position (wherein the cam of the crankshaft is in a position referred to as the bottom dead center). In this downward movement, the piston 4 passes along the inlet to the exhaust outlet port 9 which is closed by the valve 10 so that there is no flow of combustion products out of the combustion chamber 3 during the power stroke. However, once the piston 4 passes exhaust outlet port 9, the valve 10 is moved to an open position by the pressure in the combustion chamber 3 and opens thereby allowing combustion products (exhaust gas) to flow over the region 11 lacking sharp edges into the exhaust outlet port 9 to be outlet from the combustion chamber 3. FIGS. 4 and 6 show the valve 10 in its open position. The configuration and placement of the valve 10 may be via a mounting to the top of the exhaust outlet port 9 as shown or elsewhere. Preferably, the valve 10 should open inward as shown, for example, to avoid interference with the movement of the piston 4. The position of the valve 10 relative to the opening of the exhaust outlet port 9 to the cylinder wall is not critical, but is preferably close to it. The exhaust outlet port 9 may have a tubular construction.

Figure 7:
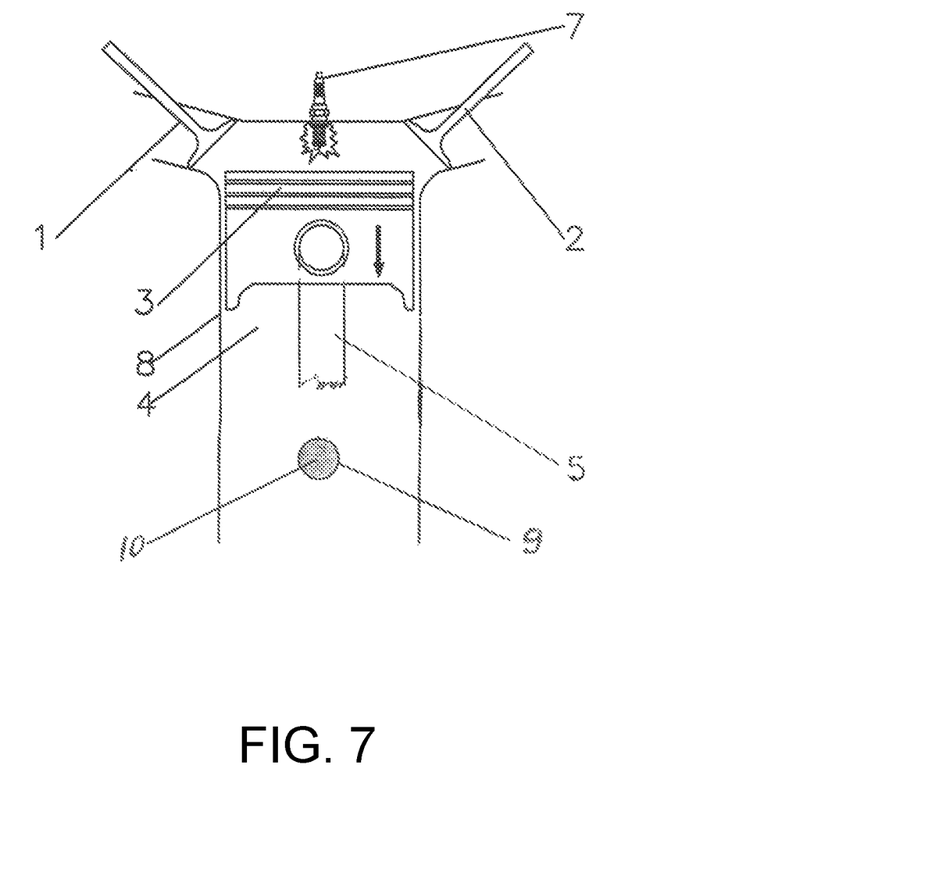
FIG. 7 is a view showing the juncture of the exhaust outlet port with a valve when in an closed position, like in FIG. 5.

As the piston 4 continues to move upward in the exhaust stroke to the position wherein the cam of the crankshaft is in a position referred as the top dead center, it causes the valve 10 to close as it passes by alongside the opening of the exhaust outlet port 9 to a position above the opening of the exhaust outlet port 9 (in the configuration shown in the drawings). FIG. 7 shows the valve 10 in its closed position. The exhaust valve 2 is then opened (it is not open in the first stage of the exhaust stroke) and remaining exhaust gas is outlet through and/or around the exhaust valve 2 into the exhaust conduit.

By constructing the cylinder 8 with an additional outlet port and positioning a valve in this outlet port, a two-stage exhaust stroke is proposed wherein the additional outlet port is used in combination with the usual exhaust port from the cylinder, but at different times. As such, not all of the exhaust gas is exhaust through the usual exhaust port, i.e., using exhaust valve 2 at the top of the cylinder 8 (i.e., on the same side of the cylinder 8 as the intake valve 1). Rather, a portion of the exhaust gas is first outlet from the combustion chamber 3 through the exhaust outlet port 9 via valve 10 in its open position, and then remaining exhaust gas is outlet from the combustion chamber through the exhaust conduit around the exhaust valve 2.

There are advantages to the dual-stage exhaust stroke obtained by the presence of the additional exhaust outlet port communicating with the combustion chamber in the cylinder dependent on the position of the piston 4. That is, the opening of the exhaust outlet port 9 is not always in communication with the combustion chamber 3. Rather, when the upper surface of the piston 4 is below the location at which the exhaust outlet port 9 connects to the peripheral wall of the cylinder 8 defining the combustion chamber 3, then there is possible communication between the exhaust outlet port 9 and the combustion chamber 3. Otherwise, when the piston 4 is alongside or above the location at which the exhaust outlet port 9 connects to the peripheral wall of the cylinder 8 defining the combustion chamber 3, there is no communication between the exhaust outlet port 9 and the combustion chamber 3. Rather, the remaining exhaust gas in the combustion chamber 3 can only be outlet around the exhaust valve 2 into the exhaust conduit.

The timing of the opening and closing of the intake valve 1 and exhaust valve 2 may be controlled by a control unit (not shown) based on the movement of the piston 4 or there may be a structural component or assembly that opens and closes the intake valve 1 and exhaust valve 2 based on the movement of the piston 4. Either way, the intake valve 1 opens only when inflow of air and fuel into the combustion chamber 3 is desired relative to the position of the piston 4 and closes when such inflow of air and fuel is not appropriate or desired. Similarly, the exhaust valve 2 opens only when outflow of exhaust gas from the combustion chamber 3 is desired relative to the position of the piston 4 and closes when such outflow is not appropriate or desired.

Advantages include a better removal of the exhaust gas from the combustion chamber, a faster removal of the exhaust gas from the combustion chamber 3, and a more complete removal of the exhaust gas from the combustion chamber 3 resulting in a better and more complete burning of the air and fuel mixture. There is also significantly less back pressure on the piston resulting in a high engine efficiency. There is also significantly less emissions, relative to standard four stroke engines, thereby reducing environmental damage and diminishing the effect of the novel engine on climate change. Additionally, there is a high recovery of exhaust gas energy that can be used to boost turbocharger performance when the exhaust gas from the exhaust conduit and the exhaust outlet port 9 are both channeled to a turbocharger. The most energy comes from the combustion gas being exhaust through the exhaust outlet port 9 and much less energy from the combustion gas being outlet around exhaust valve 2 because the back pressure on the piston 4 is significantly minimized Thus, the exhaust outlet port 9 has a much more important function than the exhaust valve 2. A junction can be provided to join the exhaust outlet port 9 and the exhaust conduit associated with the exhaust valve 2 into a common conduit. This conduit can be directed to a turbocharger to recover the energy from the exhaust gas to power a compressor or other device.

Accordingly, providing the dual-stage exhaust stroke enables an improvement in fuel economy relative to prior art engines, increased engine efficiency as well as reduced emissions and pollution.

FIGS. 8-12 relate to a different type of engine to which the dual-stage exhaust stroke can be applied. This engine is commonly known as an Atkinson Cycle engine. Conceptually, an Atkinson engine has variable stroke lengths provided by a multi-link connecting rod between the piston and the flywheel. An advantage of an Atkinson engine is on the power stroke, but there is a disadvantage on the exhaust stroke. The Atkinson cycle works for hybrids because of their electric motor(s) make up for the loss on the exhaust stroke.

The Atkinson cycle delays the intake valve's closing until the piston has completed 20 to 30 percent of its upward travel on the compression stroke. As a result, some of the fresh charge is driven back into the intake manifold by the rising piston so that the cylinder is never completely filled, thus resulting in the power reduction. After ignition, when the piston begins descending on the expansion or power stroke, there are advantages. The shortened intake stroke combined with a full-length expansion stroke squeezes more work out of every increment of fuel.

Figure 8:
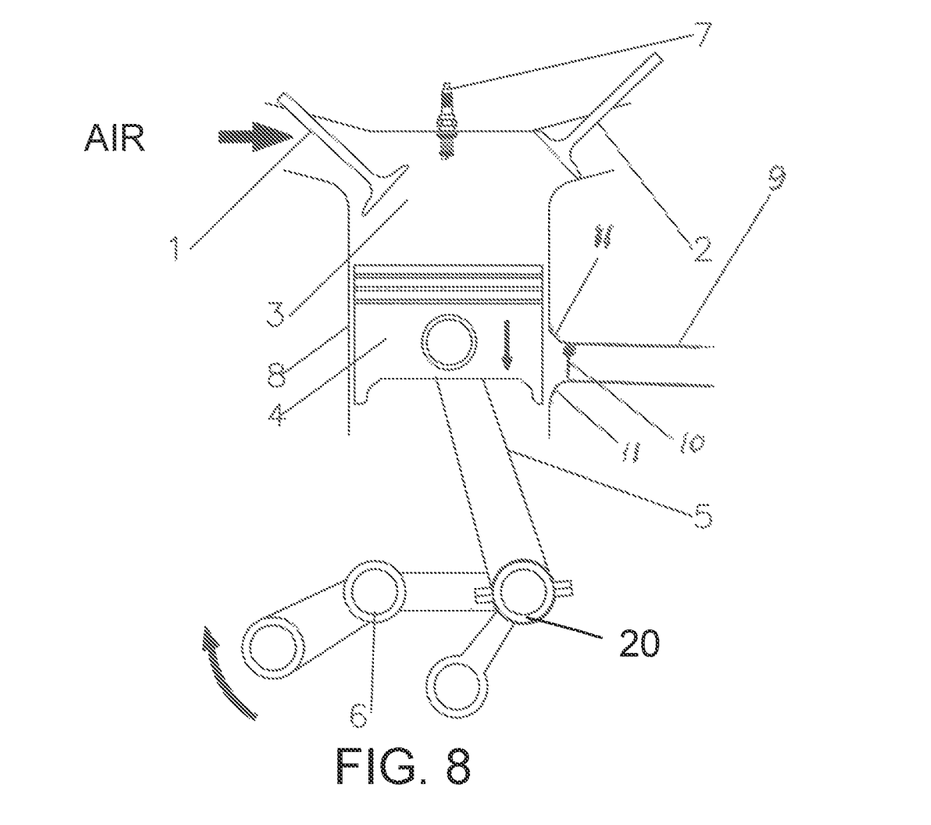
FIG. 8 is a schematic of the intake stroke of another embodiment of an engine in accordance with the invention utilizing the Atkinson concept.

FIG. 8 is a schematic of the intake stroke of an engine in accordance with the invention that is based on an Atkinson engine, which is similar to prior art intake strokes for four stroke engines utilizing the Atkinson concept. Any variant to the intake stroke in prior art Atkinson engines may be applied to the invention as well because the difference between the inventive engine and the prior art lies primarily in the exhaust cycle. Although a single cylinder is shown, it is understood that the engine may include multiple cylinders in any conventional arrangement, e.g., in a row or V-shape.

As shown in FIG. 8, the engine includes the cylinder 8, the piston 4 movable up and down in an interior space defined by the cylinder 8 and which has a connection rod 5 connecting the piston 4 to a linkage 20. The linkage 20 includes cams and shafts like a typical Atkinson engine, a description of which is not required to understand the functionality of the invention. Generally, the linkage 20 rotates crank shaft 6 in a clockwise direction as indicated by the arrow and the piston moves downward as indicated by the arrow during the intake stroke. Also shown are the intake valve 1 which is in an open position so that air can be drawn through a conduit into a combustion chamber 3 portion of the interior space defined by the cylinder 8 between an upper surface of the piston 4 and the upper surface of the cylinder 8 defining the interior space (fuel being injected into the combustion chamber 3 by a fuel injector (not shown) as in conventional prior art engines). Spark plug 7 is at the upper surface of the cylinder 8 defining the combustion chamber and represents any mechanism to generate a spark to cause ignition of gas in the combustion chamber 3.

Differing from conventional Atkinson engines, the engine includes the exhaust outlet port 9 extending from an opening on the side of the cylinder 8. This opening is positioned to be above the upper surface of the piston 4 when the piston 4 is in the down position (see FIG. 11). The valve 10, such as a reed valve, is positioned in the exhaust outlet port 9. The region 11 between the inlet of the exhaust outlet port 9 and the side, interior surface of the cylinder 8, around the circumference of the exhaust outlet port 9, is preferably made to be smooth without any sharp edges to thereby reduce turbulence (which concept of constructing or configuring engine parts without sharp edges is disclosed in U.S. Pat. No. 10,787,939, the entire disclosure of which is incorporated by reference herein).

Figure 9:
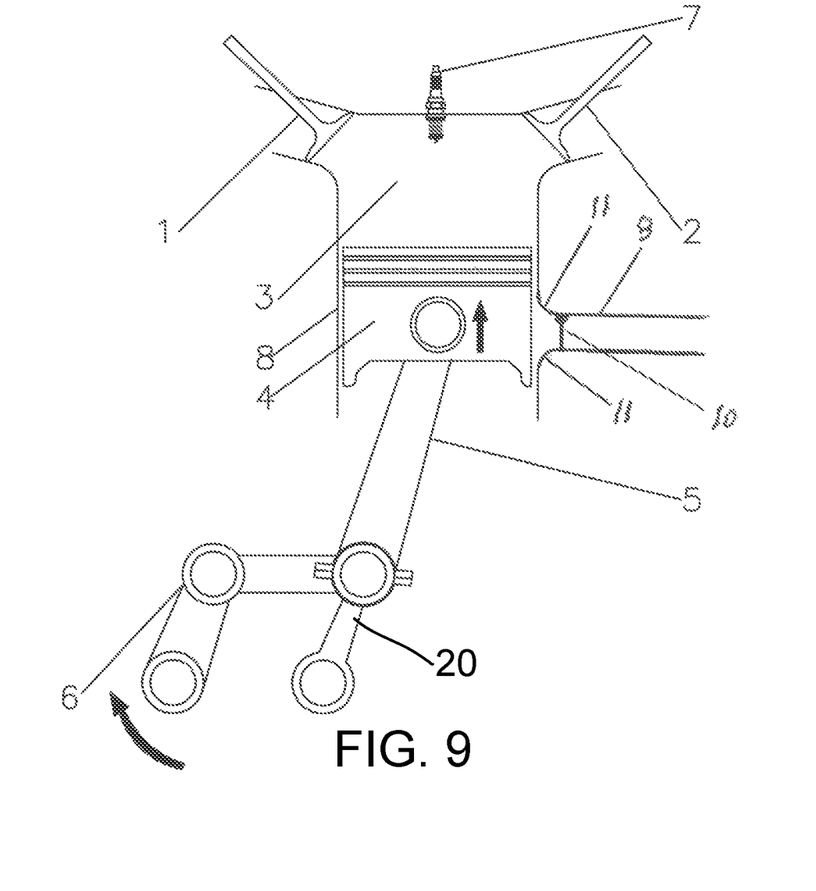
FIG. 9 is a schematic of the compression stroke of the engine of FIG. 8.

FIG. 9 depicts the compression stroke wherein the piston 4 is moving upward as indicated by the arrow on the piston 4, and the intake valve 1 is moved to a closed position, while the exhaust valve 2 remains in the closed position. Valve 10 in the exhaust outlet port 9 is in a closed position during the compression stroke, along with the exhaust valve 2.

Figure 10:
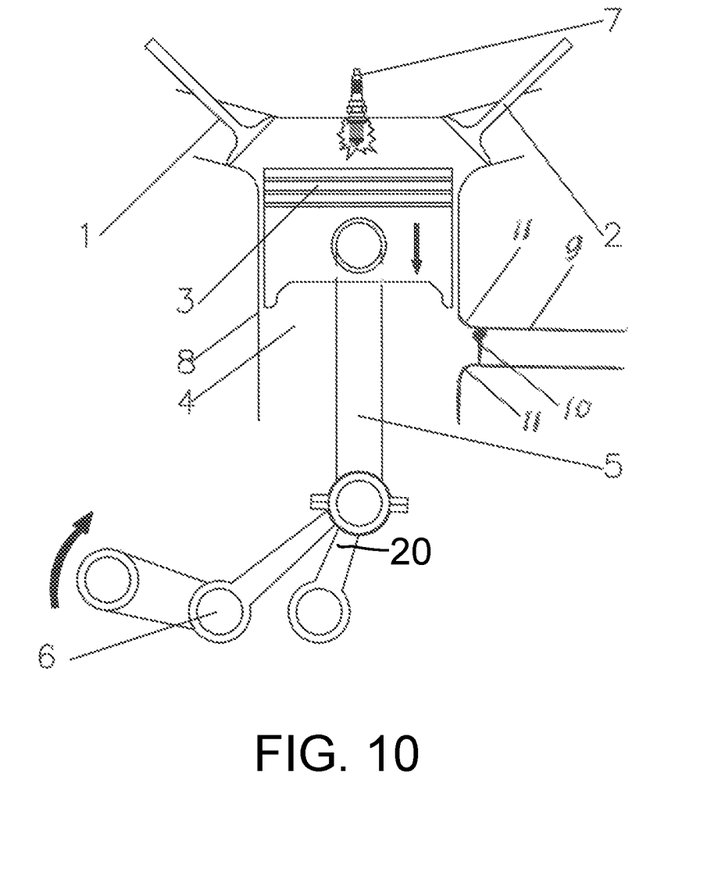
FIG. 10 is a schematic of the power stroke of the engine of FIG. 8.

FIG. 10 depicts the power stroke wherein the spark plug 7 has caused the air and fuel mixture in the combustion chamber 3 to ignite. While both the intake valve 1 and exhaust valve 2 are in a closed position, the piston 4 moves downward as indicated by the arrow. Valve 10 in the exhaust outlet port 9 is still in a closed position during the power stroke, along with the exhaust valve 2. The piston 4 is above the location at which the exhaust outlet port 9 opens into the tubular wall defining the cylinder 8.

Figure 11:
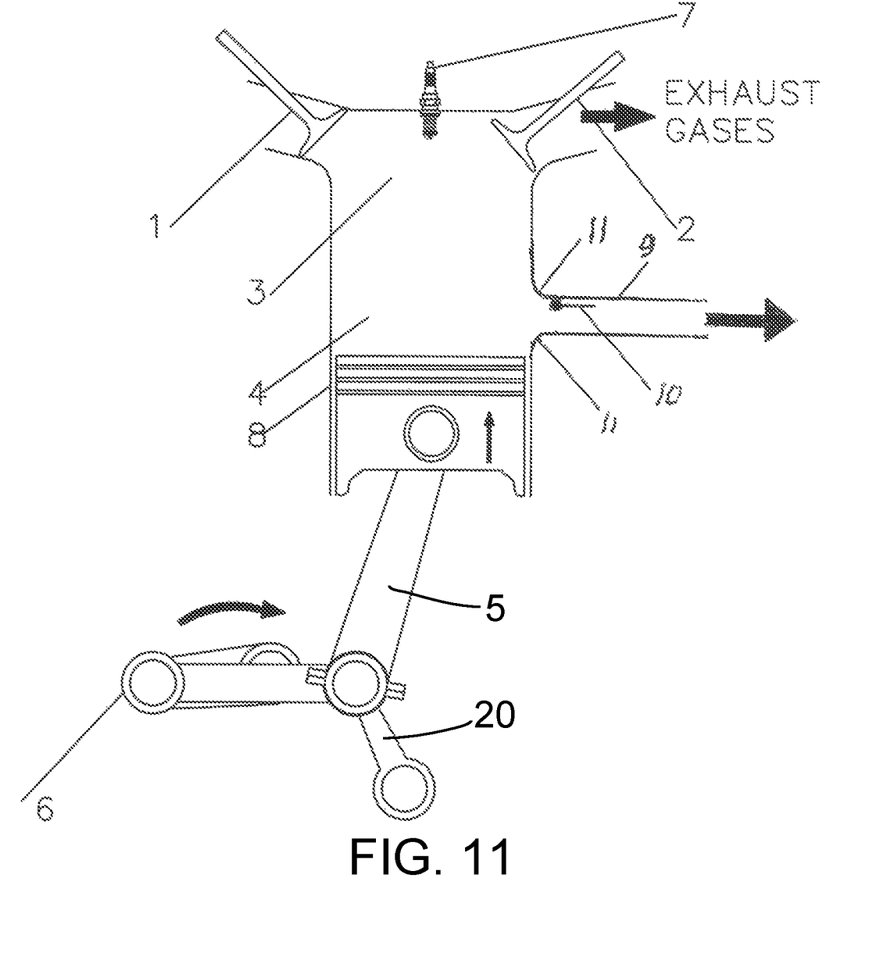
FIG. 11 is a schematic of the first stage of the exhaust stroke of the engine of FIG. 8.
Figure 12:
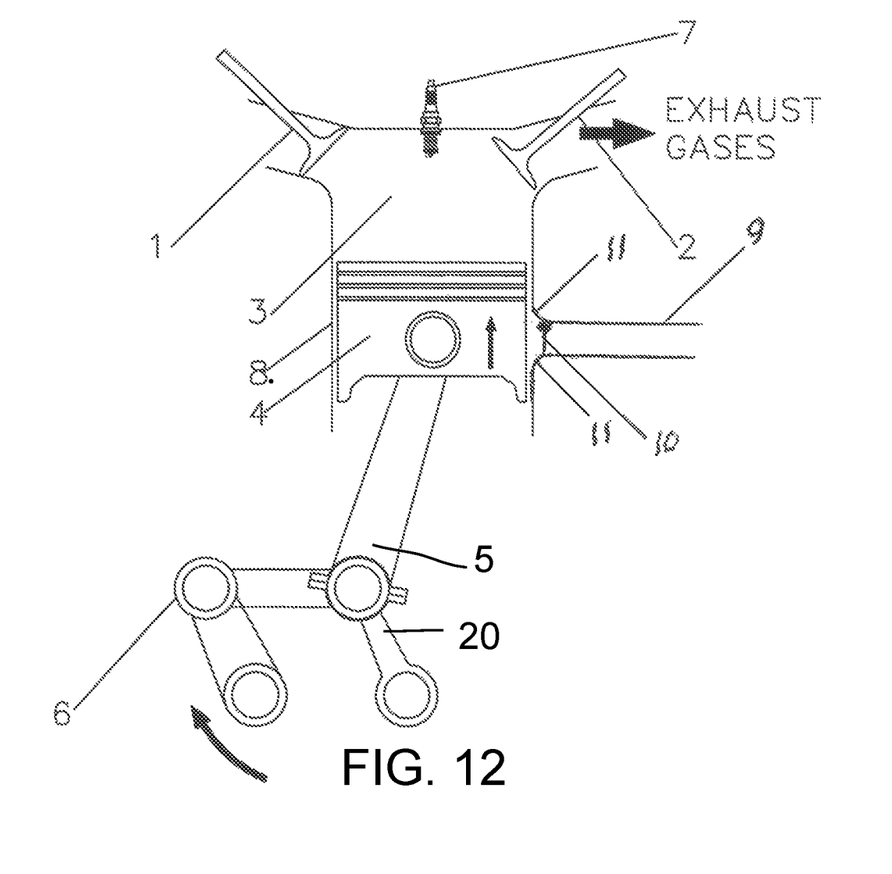
FIG. 12 is a schematic of the second stage of the exhaust stroke of the engine of FIG. 8.

FIGS. 11 and 12 show the manner in which engine operates using the additional exhaust outlet port 9 and reed valve 10. Specifically, in a first stage of the exhaust stroke, the piston 4 is moving upward after having moved downward in the power stroke shown in FIG. 10 to a lowermost position. In this downward movement, the piston 4 passes alongside the opening to the exhaust outlet port 9 which is closed by the piston 4 so that there is no flow of combustion products out of the combustion chamber 3 during the power stroke. However, once the piston 4 reaches its lowermost position (or at least to a position below the opening of the exhaust outlet port 9 to the combustion chamber 3), the valve 10 is moved to an open position by the pressure in the combustion chamber 3 and opens, thereby allowing combustion products (exhaust gas) to flow from the combustion chamber 3 over or alongside the region 11 lacking sharp edges into the exhaust outlet port 9 to be outlet from the combustion chamber 3. FIG. 6 shows the valve 10 in its open position.

As the piston 4 continues to move upward in the exhaust stroke to its uppermost position, it causes the valve 10 to close as it passes by from a position below the opening of the exhaust outlet port 9 to a position above the opening of the exhaust outlet port 9 (in the configuration shown in the drawings). FIG. 7 shows the valve 10 in its closed position. The exhaust valve 2 is then opened (it is not open in the first stage of the exhaust stroke) and remaining exhaust gas is outlet around the exhaust valve 2 into the exhaust conduit.

The same advantages of the construction of the cylinder 8 with an additional outlet port and valve positioned in this outlet port described above are equally applicable to the Atkinson engine configuration of FIGS. 8-12.

The constructions of the engines illustrated in the drawings and described above have a single, additional exhaust outlet port opening into the combustion chamber (additional to a typical exhaust port associated with an exhaust valve on the same side of the cylinder as an intake valve). This same construction can be used in any type of engine regardless of the number, portion or type of combustion chamber, i.e., add the additional exhaust outlet port to a cylinder with any number of exhaust valves. That is, whatever engine has a combustion chamber, it is possible to reconfigure that engine in accordance with the teachings of this invention by providing an additional outlet port along its wall defining the combustion chamber, not at a location above the top surface of the piston but rather at a location opposite a side of the piston so that the opening to this port can be open or closed based on piston position. This outlet port connects to the combustion chamber through an opening positioned between a point above the piston at its lowermost position in the cylinder and a point below the piston at its uppermost position in the cylinder. In this manner, there will be exhaust of combustion products through the outlet port when the upper surface of the piston is partly or entirely below the opening, and then subsequent exhaust of the remaining combustion products when the piston is above the opening through and/or around the exhaust valve. The teachings of the invention are not limited to any specific engine and specifically not the engines disclosed herein.

Moreover, although only a single exhaust outlet port 9 is shown, this is to be considered a preferred embodiment. Multiple exhaust outlet ports could also be used.

The location and shape of the opening of the exhaust outlet port 9 around the circumference of the cylinder 8 is also not limited to what is shown in the drawings, and the circumferential location of the opening may vary as desired, e.g., based on the type and construction of the engine. The piston 4 should however be configured with a solid side wall, at least along that portion that is alongside the opening, to ensure closure of the opening when the piston 4 is above the opening and prevent unwanted gas flow.

The teachings of the invention can be applied to retrofit or modify an existing engine. The existing engine would typically include a cylinder having a peripheral wall defining a combustion chamber, a crankshaft, a piston movable in the cylinder toward a first side of the cylinder in an exhaust stroke and toward a second, opposite side of the cylinder in a power stroke in which a mixture of air and fuel in the combustion chamber is ignited and the crankshaft to which the piston is coupled is moved as a result of combustion of the mixture of air and fuel, an intake valve associated with the cylinder regulating flow of air into the combustion chamber of the cylinder, and an exhaust valve associated with the cylinder regulating flow of products of combustion out of the combustion chamber. The crankshaft may be coupled to the piston via a connection rod as in FIGS. 1-7, or a multi-link connecting assembly as in FIGS. 8-12.

In the method, an exhaust outlet port 9 having an opening in the peripheral wall of the cylinder at a location between lowermost and uppermost positions of the piston is provided. The exhaust stroke is formed as a two-stage exhaust stroke by coupling an outlet port valve 10 to the exhaust outlet port 9 and which is configured to open to cause combustion products to exhaust through the outlet port valve 10 into the exhaust outlet port 9 in a first stage when an upper surface of the piston 4 is below the opening in the peripheral wall of the cylinder 8 and the piston is moving toward the first side of the cylinder 8. In the illustrated embodiment the first side of the cylinder 8 is the top or upper side, but the first side may be another side depending on the orientation or configuration of the cylinder 8.

The method also entails exhausting remaining combustion products from the combustion chamber 3 around or through the exhaust valve 2, in a second exhaust stage after the first exhaust stage, during continued movement of the piston 4 toward the first side of the cylinder 8 when the piston 4 is above the opening in the peripheral wall of the cylinder 8. The outlet port valve 10 is in a closed state during the second exhaust stage. In some embodiments, a spark plug 7 is provided to ignite the mixture of air and fuel in the combustion chamber to cause the power stroke. The outlet port valve 10 may be coupled to the exhaust outlet port 9 by placing it in the exhaust outlet port 9 as shown, or another type of placement. In another embodiment, coupling the outlet port valve 10 to the exhaust outlet port 9 entails placing a reed valve in the exhaust outlet port 9.

Generally, the outlet port valve 10 is associated with the exhaust outlet port 9 which means that it is coupled to it to enable the desired functionality, i.e., open based on a pressure differential to allow flow from the combustion chamber 3 into the exhaust outlet port 9. Also, the outlet port valve 10 is preferably configured to open based on a pressure differential whereby a greater pressure in the combustion chamber 3 than in the exhaust outlet port 9 causes movement of the outlet port valve 10 to the open state.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Furthermore, the absence of structure in the drawings may be, in some embodiments, considered to indicate that such structure is intentionally lacking and omitted in an engine or other arrangement disclosed herein. The absence of such structure can, in some embodiments, provide benefits.

The invention claimed is:

1. An engine, comprising:
    a cylinder having a peripheral wall defining a combustion chamber;
    a crankshaft;
    a piston movable in said cylinder toward a first side of said cylinder in a compression stroke and an exhaust stroke and toward a second, opposite side of said cylinder in an intake stroke in which air is inlet into the combustion chamber and a power stroke in which a mixture of air and fuel in said combustion chamber is ignited and said crankshaft to which said piston is coupled is rotated as a result of combustion of the mixture of air and fuel, an order of the strokes being intake stroke, compression stroke, power stroke and exhaust stroke;
    an intake valve associated with said cylinder and regulating flow of air into said combustion chamber;
    an exhaust valve associated with said cylinder and regulating flow of products of combustion in said combustion chamber out of said combustion chamber;
    an exhaust outlet port having an inlet communicating with and distanced from an opening in said peripheral wall of said cylinder at a location between lowermost and uppermost positions of said piston, said opening in said peripheral wall of said cylinder being larger than said inlet of said exhaust outlet port and including a curved beveled edge in an entire transition region between and including an edge of said peripheral wall of said cylinder and said inlet of said exhaust outlet port; and
    a reed valve in said exhaust outlet port,
    whereby the exhaust stroke is a two-stage exhaust stroke wherein in a first exhaust stage, combustion products exhaust through said exhaust outlet port when an upper surface of said piston is below said opening, said piston is moving toward the first side of said cylinder and said reed valve is in an open state, and in a second exhaust stage after the first exhaust stage during continued movement of said piston toward the first side of said cylinder past said opening in said peripheral wall of said cylinder, said reed valve is in a closed state and remaining combustion products in said combustion chamber exhaust around said exhaust valve.

2. The engine of claim 1, wherein said piston is movable toward the second side of said cylinder in the intake stroke after the exhaust stroke which enables more air to be inlet into said combustion chamber.

3. The engine of claim 1, further comprising a spark plug to ignite the mixture of air and fuel in said combustion chamber to cause the power stroke.

4. The engine of claim 1, wherein said reed valve is configured to open based on a pressure differential whereby a greater pressure in said combustion chamber than in said exhaust outlet port causes movement of said reed valve to the open state.

5. The engine of claim 1, wherein said piston has a solid wall along a portion that passes alongside said opening.

6. The engine of claim 1, further comprising a connection rod to connect said piston to said crankshaft.

7. The engine of claim 1, further comprising a multi-link connecting rod to connect said piston to said crankshaft.

8. The engine of claim 1, wherein said intake valve and said exhaust valve are at said first side of said cylinder.

9. The engine of claim 1, wherein said reed valve is mounted to a top of said exhaust outlet port, inward of the entire transition region between and including the edge of said peripheral wall of said cylinder and said inlet of said exhaust outlet port.

10. A method for modifying an engine including a cylinder having a peripheral wall defining a combustion chamber, a crankshaft, a piston movable in the cylinder toward a first side of the cylinder in a compression stroke and an exhaust stroke and toward a second, opposite side of the cylinder in an intake stroke in which air is inlet into the combustion chamber and a power stroke in which a mixture of air and fuel in the combustion chamber is ignited and the crankshaft to which the piston is coupled is rotated as a result of combustion of the mixture of air and fuel, an intake valve associated with the cylinder regulating flow of air into the combustion chamber, and an exhaust valve associated with the cylinder regulating flow of products of combustion in the combustion chamber out of the combustion chamber, an order of the strokes being intake stroke, compression stroke, power stroke and exhaust stroke, the method comprising:
    providing an exhaust outlet port having an inlet communicating with and distanced from an opening in the peripheral wall of the cylinder at a location between lowermost and uppermost positions of the piston, the opening in the peripheral wall of the cylinder being larger than the inlet of the exhaust outlet port and including a curved beveled edge in an entire transition region between and including an edge of the peripheral wall of the cylinder and the inlet of exhaust outlet port; and forming the exhaust stroke as a two-stage exhaust stroke by:

positioning a reed valve in the exhaust outlet port and which is configured to open to cause combustion products to exhaust into the exhaust outlet port in a first exhaust stage when an upper surface of the piston is below the opening in the peripheral wall of the cylinder and the piston is moving toward the first side of the cylinder, and     exhausting remaining combustion products from the combustion chamber around the exhaust valve, in a second exhaust stage after the first exhaust stage, during continued movement of the piston toward the first side of the cylinder when the piston is above the opening in the peripheral wall of the cylinder, the reed valve being in a closed state during the second exhaust stage.

11. The method of claim 10, wherein a spark plug is provided to ignite the mixture of air and fuel in the combustion chamber to cause the power stroke.

12. The method of claim 10, wherein the reed valve is configured to open based on a pressure differential whereby a greater pressure in the combustion chamber than in the exhaust outlet port causes movement of the reed valve to the open state.

13. A cylinder arrangement for an engine; comprising:

a peripheral wall of a cylinder defining a combustion chamber;

a piston that moves in said combustion chamber toward a first side of the cylinder in a compression stroke and an exhaust stroke and toward a second, opposite side of the cylinder in an intake stroke in which air is inlet into the combustion chamber and a power stroke in which a mixture of air and fuel in said combustion chamber is ignited, an order of the strokes being intake stroke, compression stroke, power stroke and exhaust stroke;

an intake valve regulating flow of air into said combustion chamber;

an exhaust valve regulating flow of products of combustion in said combustion chamber out of said combustion chamber;

an exhaust outlet port having an inlet communicating with and distanced from an opening in said peripheral wall of the cylinder at a location between lowermost and uppermost positions of said piston, said opening in said peripheral wall of the cylinder being larger than said inlet of said exhaust outlet port and including a curved beveled edge in an entire transition region between and including an edge of said peripheral wall of the cylinder and said inlet of said exhaust outlet port; and a reed valve in said exhaust outlet port, whereby the exhaust stroke is a two-stage exhaust stroke wherein in a first exhaust stage, combustion products exhaust through said exhaust outlet port when an upper surface of said piston is below said opening in said peripheral wall of the cylinder, said piston is moving toward the first side of the cylinder and said reed valve is in an open state, and in a second exhaust stage after the first exhaust stage during continued movement of said piston toward the first side of said cylinder past said opening in said peripheral wall of the cylinder, said reed valve is in a closed state and remaining combustion products in said combustion chamber exhaust around said exhaust valve.

14. The cylinder arrangement of claim 13, wherein said intake valve and said exhaust valve are at said first side of the cylinder.

15. The cylinder arrangement of claim 13, wherein said reed valve is mounted to a top of said exhaust outlet port, inward of the entire transition region between and including the edge of said peripheral wall of said cylinder and said inlet of said exhaust outlet port.

* * * * *